United States Patent
Calderon Degollado et al.

(10) Patent No.: US 8,641,940 B2
(45) Date of Patent: Feb. 4, 2014

(54) METHOD FOR CONSTRUCTING A MONOLITHIC REFRACTORY CONCRETE FURNACE FOR THE MANUFACTURE OF GLASS

(75) Inventors: Humberto Calderon Degollado, Nuevo León (MX); Mario Roberto Estrada-Zavala, Nuevo León (MX); Miguel Humberto Rangel-Soto, Nuevo León (MX); Armando Raúl Elizondo-Valdez, Nuevo León (MX); Francisco Efraín Garcia-Rodriguez, Nuevo León (MX)

(73) Assignee: Compania Vidriera, S.A. de C.V., Monterrey (MX)

( * ) Notice: Subject to any disclaimer, the term of this patent is extended or adjusted under 35 U.S.C. 154(b) by 164 days.

(21) Appl. No.: 13/139,355

(22) PCT Filed: Dec. 17, 2008

(86) PCT No.: PCT/MX2008/000173
§ 371 (c)(1),
(2), (4) Date: Aug. 18, 2011

(87) PCT Pub. No.: WO2010/071388
PCT Pub. Date: Jun. 24, 2010

(65) Prior Publication Data
US 2011/0291310 A1  Dec. 1, 2011

(51) Int. Cl.
*E04B 1/16* (2006.01)

(52) U.S. Cl.
USPC ............. 264/34; 264/31; 264/297.9; 264/333

(58) Field of Classification Search
USPC .................... 264/31, 34, 297.9, 333
See application file for complete search history.

(56) References Cited

U.S. PATENT DOCUMENTS 6,289,694 B1     9/2001  Pieper

FOREIGN PATENT DOCUMENTS

| BE | 851336 | * | 5/1977 |
| FR | 604010 | | 4/1926 |
| GB | 1286371 | | 8/1972 |

OTHER PUBLICATIONS

International Preliminary Report on Patentability for International Application No. PCT/MX2008/000173, dated Jul. 5, 2011.

* cited by examiner

*Primary Examiner* — Monica Huson
*Assistant Examiner* — Saeed Huda
(74) *Attorney, Agent, or Firm* — Abelman, Frayne & Schwab

(57) ABSTRACT

A method for the monolithic furnaces construction with refractory concrete for the manufacture of glass through the formation of temporary structures for the filling and molded of refractory concrete.

10 Claims, 7 Drawing Sheets

METHOD FOR CONSTRUCTING A MONOLITHIC REFRACTORY CONCRETE FURNACE FOR THE MANUFACTURE OF GLASS

BACKGROUND OF THE INVENTION

A. Field of the Invention

The present invention relates to a method for the furnaces construction for the glass manufacture and more particularly to a method for the furnaces construction for the manufacture of glass, built entirely with refractory concrete using temporary structure for filling and refractory concrete molded to obtain a monolithic-type unit.

B. Description of the Related Art

The conventional design of furnaces for glass production includes the use of masonry, that is to say, the use of bricks and blocks which are assembled using mortar and/or cement to build each one of the sections that constitute the unit. These refractory materials are selected in order to attain a useful life as production plans. Currently, according to economic analysis of the industry, the useful life of a furnace is between 4 and 12 years before requiring a total reconstruction.

Studying the procedures used in the construction of buildings and ordinary structures built with hydraulic concrete from Portland cement, in accordance with this invention, a technology developed for the lifting of furnaces to produce molten glass, now using refractory concrete type whose characteristics are in a monolithic structure, substantially hermetic with the appropriate mechanical and thermal behavior acquiring sufficient strength by forging a share of the environment without requiring a pre-sintering the unit is put into operation.

OBJECTIVES OF THE INVENTION

It is therefore a main objective of this invention to provide a method for the monolithic furnace construction with refractory concrete for the glass manufacture using temporary structures.

It is also a main objective of this invention to provide method for the monolithic furnace construction with refractory concrete for the glass manufacture, using temporary structures, that improves its thermal efficiency resulting in fuel savings and reduce the time required for heating in the initial phase of operation.

An additional objective of this invention is to provide a method for the monolithic furnace construction with refractory concrete for the glass manufacture, using temporary structures, resulting in a greater durability in critical areas due to reduced erosion and chemical corrosion, resulting from the absence of joints de between structural components.

An additional objective of this invention to provide a method for the monolithic furnace construction with refractory concrete for the glass manufacture, the nature described above, low cost, from the initial construction, maintenance and repair whereby it is possible to attain a significant reduction in construction time and requires fewer workers than that demanded by units raised in the conventional manner, and when the operation is interrupted to perform repairs inside the furnace, work is limited to cleaning, removal of scabs and replacement glass and materials in areas with pronounced wear.

These and other objectives and advantages of the method for the monolithic furnace construction with refractory concrete for the glass manufacture, for this invention could be visualized by experts in the field, the following detailed description of the embodiments preferred of the invention will be within the scope of the claimed invention.

DETAILED DESCRIPTION OF THE INVENTION

The integral method for the monolithic furnace construction with refractory concrete for the glass manufacture, using temporary structures, of this invention will be described below making reference to the specific embodiments of the same and to the drawings enclosed as figures, where the same signs refer to the same parts of the shown figures.

Figure 1:
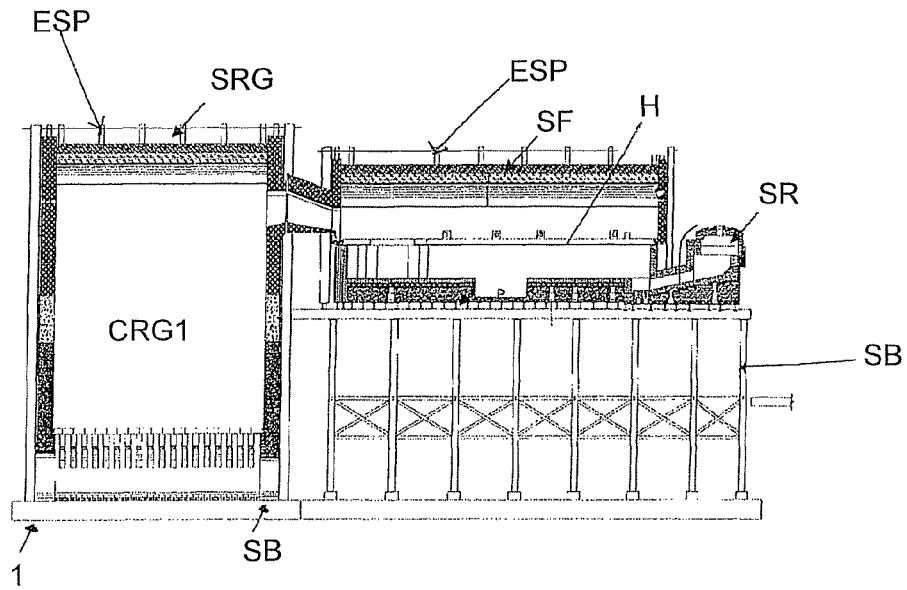
FIG. 1 is a cross-sectional view of a side elevation of a monolithic furnace for the manufacture of glass containers, schematized, showing its several sections in conformity with the method of the present invention.
Figure 2:
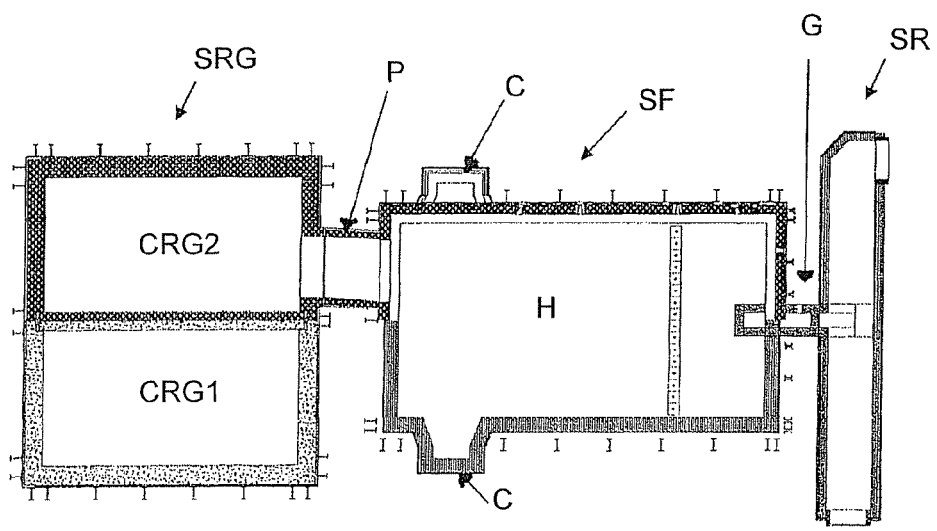
FIG. 2 is an upper plant cross section view of the furnace in FIG. 1, showing several sections.

A typical glass melting furnace, known as regenerative furnace with "end port" includes sections that have specific functions such as, at least one regeneration section SRG, one melting section SF, and one refining section SR (FIGS. 1 and 2), each of which, according to this invention, is built entirely with refractory concrete on a support structure basal SB.

I. Basal Supporting Structure

The support structure basal SB (FIG. 1) constructed with a robust slab 1, made with hydraulic concrete from cement Portland, a resistance element such that it is able to maintain and safe from collapse or excessive deformation action or settlements buildings that make up the furnace. The slab 1 can be wall placed directly on the natural terrain to be the only support element or as part of a system when combined with those recommended by a geotechnical study.

II. Peripheral Support Structure

Prior to any action to establish element of refractory concrete buildings, constructed the assembly of columns, beams, floor systems and lateral restraint elements (bracing) that faun the peripheral support structure EPS to the furnace (FIG. 1) responsible for the structural integrity of the unit during the entire period of operation, which as described below, constitute a major part for the rest necessary maneuvering in construction.

III. Temporary Structures and Molds.

1. Construction

The configuration, number and size of building components are made based on guidelines and recommendations governing of the analysis and design of structures, according to the manufacturing material treated in turn.

A. Regeneration Section

Walls

Inferior Section of Walls

Figure 3A:
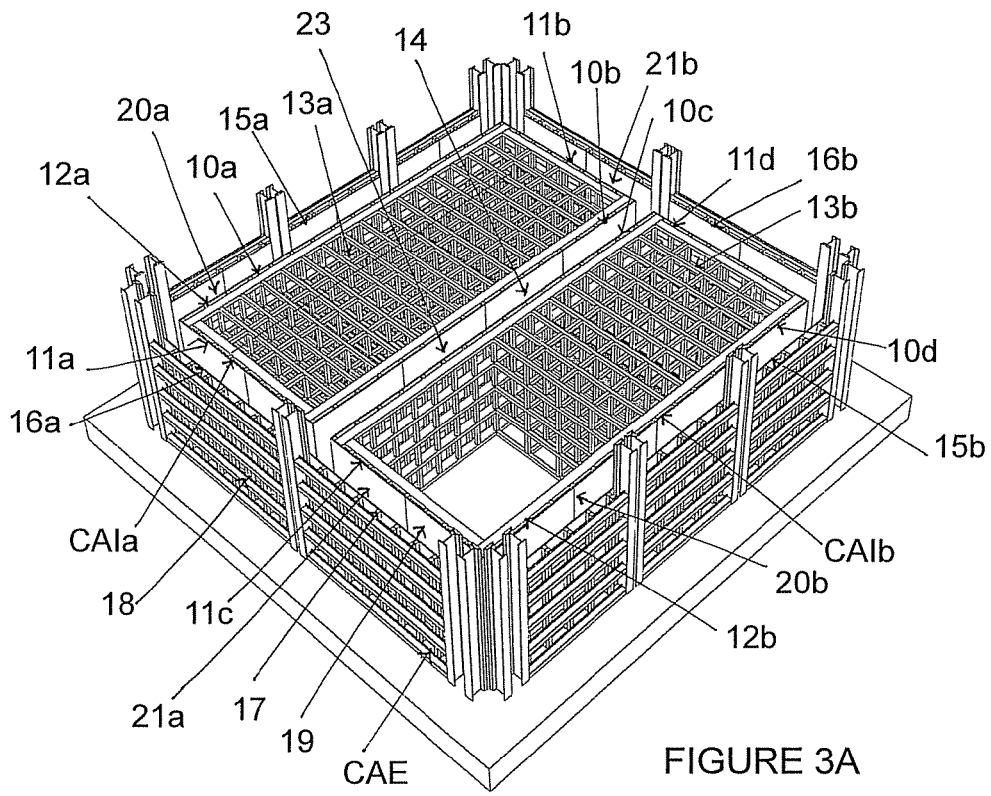
FIGS. 3A, 3B, 3C and 3D are conventional perspective views of the regenerative section, illustrating the conventional way to construct the regeneration section showing the sections inferior, middle, high, respectively of the regenerative chambers with side walls, front, backside and vaults.

The confinement structure of refractory concrete cool for the regenerative chambers CRG2 and CRG1 of the regeneration section SRG (FIG. 2), was built on the robust slab 1 of the basal supporting structure SB (FIG. 1), manufacturing two internal annular temporary structures CAIa, CAIb (FIG. 3A), each with side plates 10a, 10b, 10c and 10d of wood and outer plates 11a, 11b, 11c and 11d forming each of the internal annular temporary structures CAIa and CAIb, each retained by a structure of crossbars formed by vertical crossbars 12a and 12b and a reticulate network of horizontal crossbars 13a and 13b, placing internal annular temporary structures CAIa and CAIb next to another, leaving a hollow space 14 between them through, and forming an outer annular temporary structure CAE, by side plates 15a and 15b and outer plates 16a and 16b, externally supported by vertical bars 17 for rigidity and reinforced with beams 18 placed horizontally and externally to the plates 15a, 15b and 16a, 16b; the outer annular temporary structure CAE is built on the periphery of the two internal annular temporary structures CAIa and CAIb, surrounding them leaving a hollow space 19 between internal annular temporary structures CAIa, CAIb and the outer annular temporary structure CAE; and filling the annular hollow space delimited by the plates of the outer annular temporary structure CAE and internal annular temporary structure CAIa, CAIb, as well as, the intermediate hollow space 14 left between the internal annular temporary structures CAIa, CAIb, with refractory concrete and once that has set the refractory concrete, forming side walls 20a and 20b, outer walls 21a and 21b and middle wall 23 and remove the outer annular temporary structure CAE and internal annular temporary structures CAIa and CAIb.

Middle Section Walls

Figure 3B:
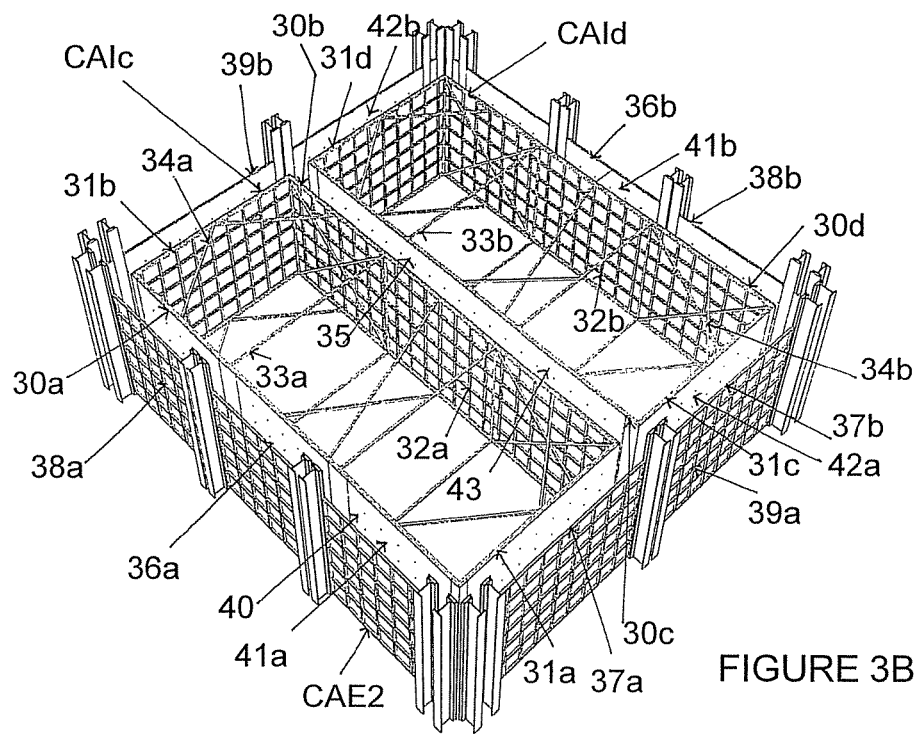

The regenerative chambers CRG1 and CRG2 and the regeneration section SRG (FIG. 2) in the middle section are built on the inferior section of walls, making first two internal annular temporary structures CAIc, CAId, (FIG. 3B), each with side plates 30a, 30b, 30c and 30d of wood and outer plates 31a, 31b, 31c and 31d forming each of the internal annular temporary structures CAIc and CAId, each retained by a structure of crossbars formed by reticulate network formed by vertical and horizontal crossbars 32a and 32b retained by horizontal crossbars 33a and 33b, diagonal crossbars 34a and 34b between opposite side plates 30a and 30b and between 30c and 30d, putting the internal annular temporary structures CAIc, CAId, one side of the other, leaving a cavity through 35 between them; and forming an outer annular temporary structure CAE2 by side plates 36a and 36b and outer plates 37a and 37b, of steel, each retained by a structure of crossbars formed by a reticulate network formed by vertical and horizontal crossbars 38a, 38b and 39a and 39b for rigidity and putting outside the plates 36a, 36b and 37a, 37b; this outer annular temporary structure CAE2 is built on the periphery of the two internal annular temporary structures CAIc and CAId around the same, leaving a hollow space 40 between the temporary structures CAIc, CAId and outer annular temporary structure CAE2; and filling the hollow space delimited by plates of the outer annular temporary structure CAE2 and internal annular temporary structures CAIc, CAId, as well as, the intermediate hollow space 35 between the internal annular temporary structures CAIc and CAId, with refractory concrete and once that has set the refractory concrete, forming side walls 41a, 41b, outers walls 42a and 42b and intermediate wall 43 and remove the outer annular temporary structure CAE2 internal annular temporary structure CAIc y CAId.

Upper Section of Walls

Figure 3C:
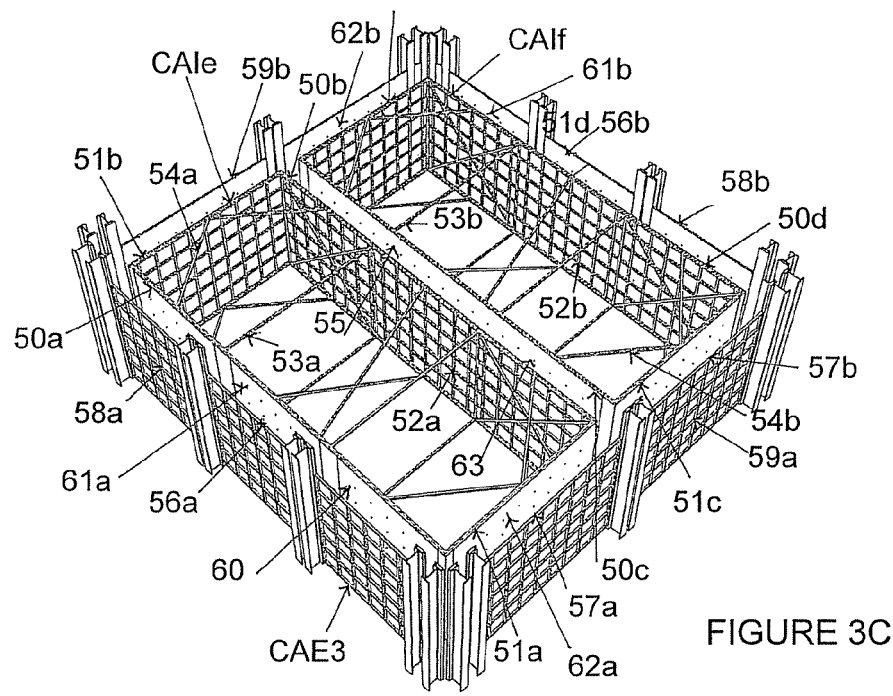

Regenerative chambers CRG1 and CRG2 of the regeneration section SRG (FIG. 2) in the top section is built on the middle section of wall, making two internal annular temporary structures CAIe, CAIf (FIG. 3C), each with side plates 50a, 50b, 50c and 50d and outer plates 51a, 51b, 51c and 51d forming each of the internal annular temporary structure CAIe and CAIf, each retained by a crossbars structure formed by a lattice network formed by vertical and horizontal crossbars 52a and 52b retained by horizontal crossbars 53a and 53b and diagonal crossbars 54a and 54b between opposite side plates 50a and 50b, and between 50c and 50d, placing the internal annular temporary structures CAIe and CAIf next to each other, leaving a intermediate hollow space 55 between them, and forming an outer annular temporary structure CAE3 by side plates 56a and 56b and outer plates 57a and 57b from steel, each retained by a crossbars structure formed by a lattice network formed by vertical and horizontal crossbars 58a, 58b, 59a and 59b; this outer annular temporary structure CAE3 is built in the periphery of the two internal annular temporary structures CAIe and CAIF, around the same leaving a hollow space 60 between the internal annular temporary structures CAIe and CAIf and the outer annular temporary structure CAE3, and filling the hollow space delimited by the plates of the outer annular temporary structure CAE3 and internal annular temporary structures CAIe, CATS, as well as, intermediate hollow space 55 between the internal annular temporary structures CAIe and CAIf, with refractory concrete and, once has set refractory concrete, forming side walls 61a, 61b, outer walls 62a and 62b and intermediate wall 63 and remove the outer annular temporary structure CAE3 and internal annular temporary structures CAIe and CAIf.

Vault

Figure 3D:
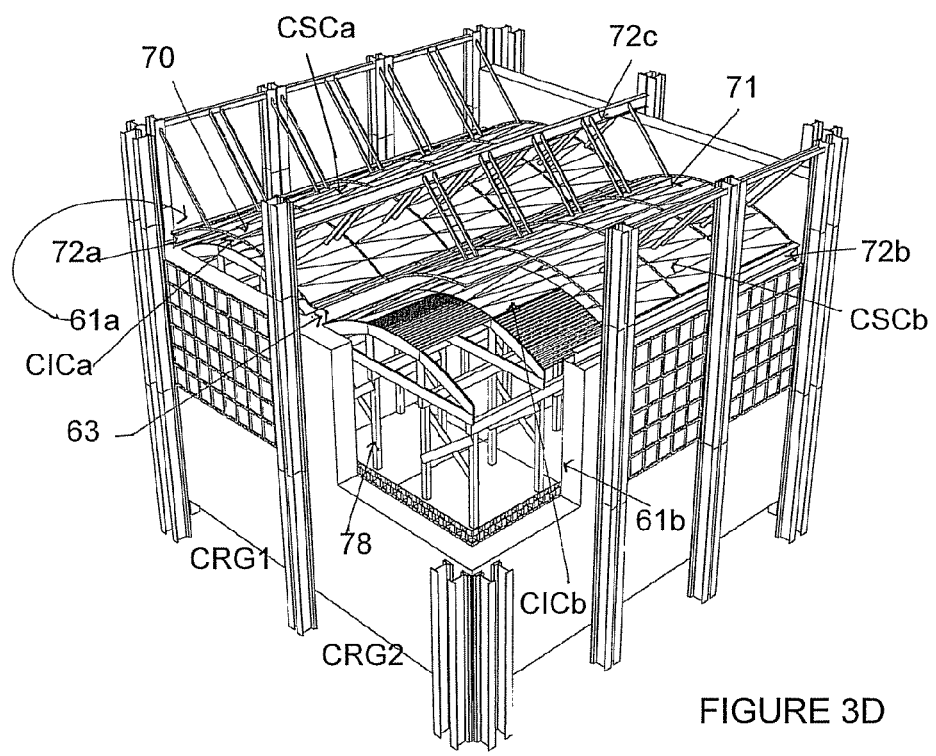

Each of the vaults 70 and 71 (FIG. 3D) for each of the regenerative chambers CRG1 and CRG2 was built putting a lateral support beam 72a and 72b, supported on each of the side walls 61a and 61b. The ends of each of the vaults 70 and 71 are supported by lateral support beams 72a and 72b and the middle wall 63, and aiming a first convex inferior temporary structure CICa formed with wooden planks, supported internal edge of the side wall 61a and the first internal edge of intermediate wall 63 and a second lower convex temporary structure CICb, also made of wooden planks, supported in the second internal edge of the intermediate wall 63 and the internal edge of side wall 61b; convex lower temporary structure both CICa and CICb were retained by a scoring 78 for its lower concave part, and forming a first convex upper temporary structure CSCa, by plates, supported on the outer edge of sidewall 61a and the top flange of the beam 72a and supported by longitudinal beam 72c above the intermediate wall 63 and a second convex outer temporary structure CSCb resting on the outer edge of side wall 61b and the top flange of the beam 72b and supported by a longitudinal beam 72c above the intermediate wall 63, forming two convex drawers, in which the concrete refractory is poured to the top of the convex drawers, after setting the refractory concrete, the temporary structure is removed.

B. Melting Section

Figure 4:
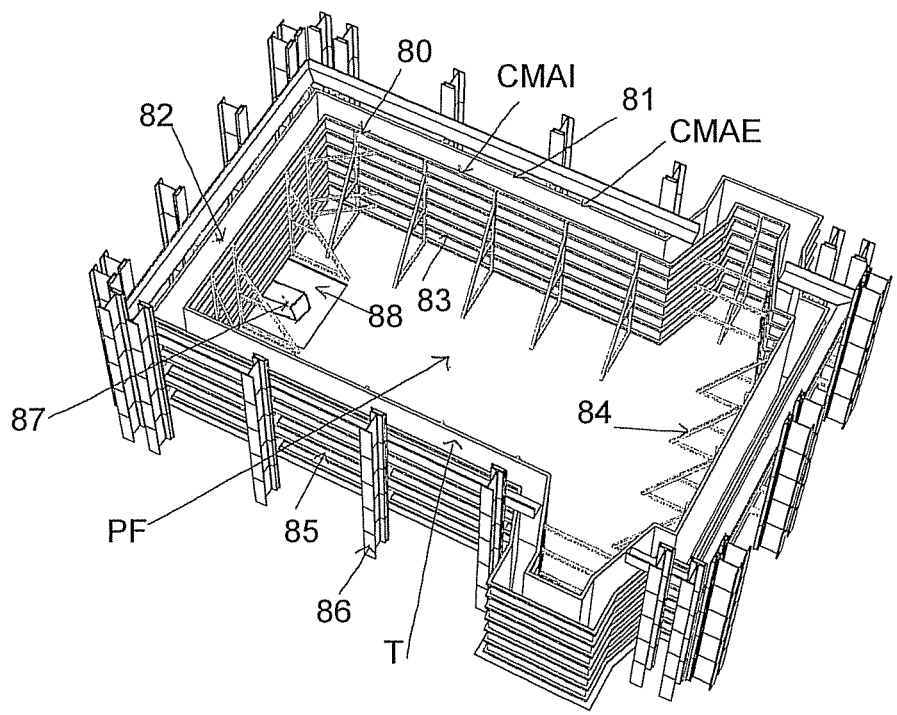
FIG. 4 is a conventional perspective view of the built way the cup melting section of the furnace, with its annular wall.

Cup:

The Melting section SF hereafter referred to only as furnace H was built leaning on the support structure of the furnace peripheral ESP (FIG. 1), building a temporary structure of internal annular wall CMAI (FIG. 4) built with a structure annular internal 80 and a temporary structure of outer annular wall CMAE built with structure of outer annular plates 81, surrounding the temporary structure of internal annular wall CMAI separate parallel to each other, forming a hollow annular space 82 between them; the internal plates 80 are supported externally by a structure of horizontal bars 83 for rigidity, so that the internal surfaces were in contact with the refractory concrete and are retained by struts 84; the outer plates 81 are supported by a structure of horizontal bars 85 retained by vertical beams 86 resting on the peripheral support structure ESP of furnace H placed outside the structure of horizontal bars 85, are placed prismatic molds 87 laterally supported in the temporary structure of internal annular wall CMAI, to form the hollow spaces 88 required for the connection of refining section SR with one or more throat G of furnace H and finally fills the hollow annular space 82 delimited by the internal plates 80 and outer plates 81, with refractory concrete and once the concrete set forming a cup T of furnace H and removed the temporary structure; and finally empties a floor plate founder PF of refractory concrete delimited by the cup T.

Figure 5:
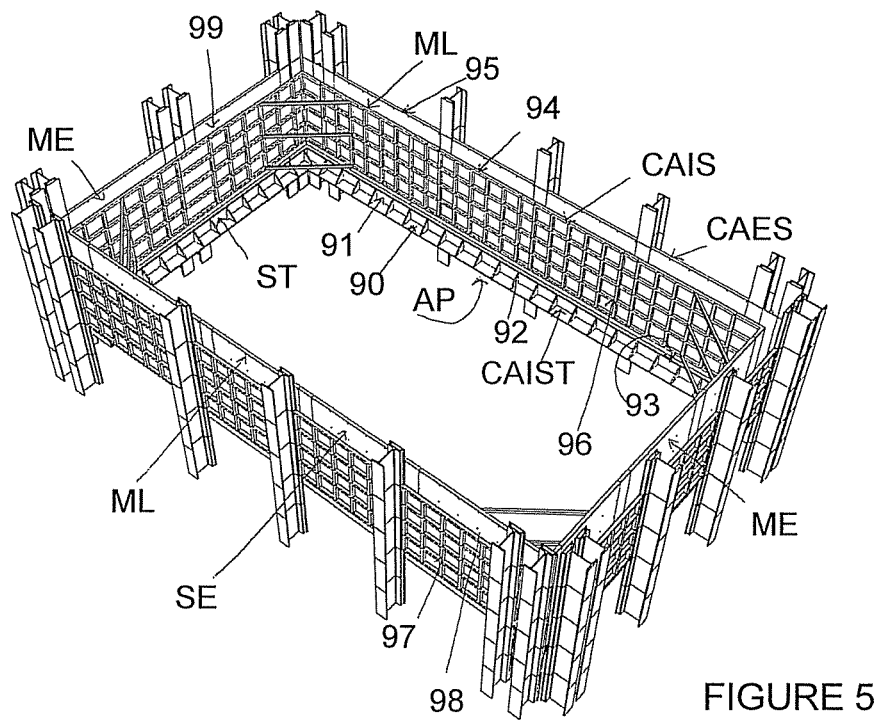
FIG. 5 is a conventional perspective view of the built way of the superstructure including the section on cup melting furnace

Superstructure:

The superstructure SE (FIG. 5) is built by over cup ST and side walls ML and outer ME. The over cup ST is built on a perimetral angle AP supported on the peripheral support structure ESP of the furnace H, by a internal annular temporary structure CAIST, consisting of a floor plate 90 supported on the cup T and a vertical plate 91 resting on the floor plate 90 and reinforced by square 92 which hold both plates 90 and 91, leaving a hollow annular space 93 that is filled with refractory concrete forming the over cup ST that works as base walls ML and ME. The walls are built by internal annular temporary structure CAIS, and one outer annular temporary structure CAES each one formed by internal steel plates 94 and outer steel plates 95, each one hold by a reticulate structure of crossbars 96 and 97. The outer annular temporary structure CAES is retained by the peripheral support structure ESP of furnace H and the internal annular temporary structure CAIS is attached to the outer annular temporary structure CAES by tensors 98 which separate the temporary structure parallel CAIS and CAES forming a hollow annular space 99 between them, which is filled with refractory concrete and, once the concrete refractory has hardened, forming the superstructure SE, the temporary structures CAIS and CAES are removed.

Vault

Figure 6:
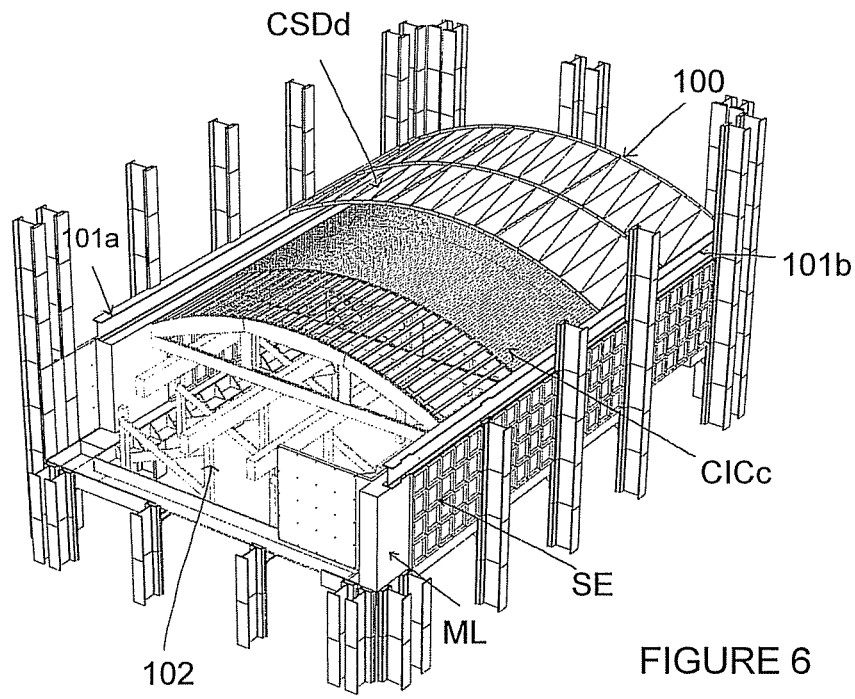
FIG. 6 is a conventional perspective view of the built way the vault of the melting furnace section.

The vault 100 of founder F of the furnace H (FIG. 6) is built by placing beams of side support 101*a* and 101*b* supported on each one of the side walls ML of the super structure SE and forming a lower convex temporary structure CICc, made with wooden planks, supported in the internal edges of the side walls ML and supported by shoring 102 by its lower concave part, and a convex outer temporary structure CSCd supported in the upper rollers of the beams 101*a* and 101*b*, forming a convex drawer, in which is emptied the refractory concrete from the top convex drawer forming the vault 100, once the concrete refractory has hardened the temporary structure is removed.

C. Ports

Walls

Figure 7:
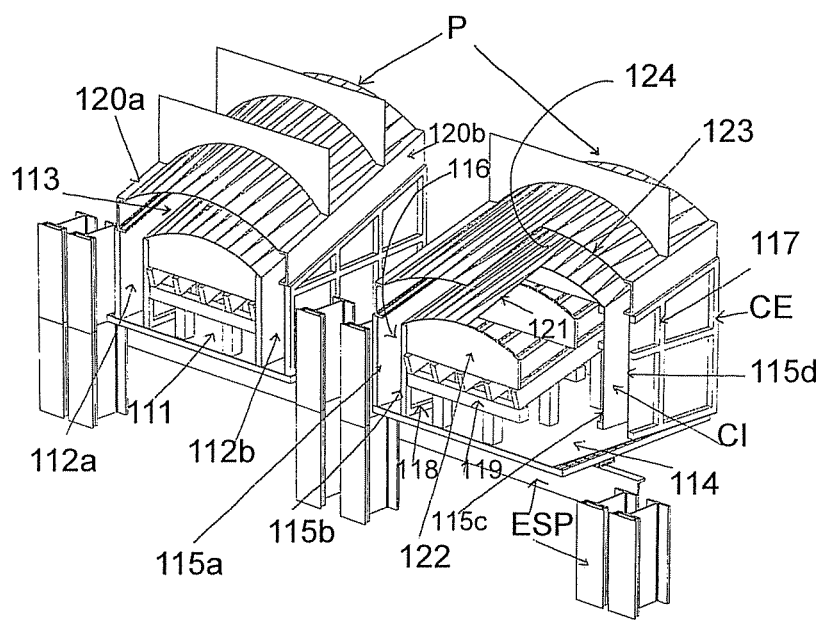
FIG. 7 is a conventional perspective view of the built way the ports that connect the regeneration section with the melting section.

The furnace H also includes two or more ports P (FIG. 7) that attach regenerative chambers CRG2 and CRG1 with the melting section SF of the furnace H, each one formed by a floor 111, side walls 112*a* and 112*b* and a vault 113: the floor 111 of each one of the ports P is formed by a steel plate 114 attached to the peripheral support structure furnace ESP; each one of the side walls 112*a* and 112*b* is formed by outer temporary structure CE and internal CI supported in plate 114 by separate parallel plates 115*a*, 115*b*, 115*c*, and 115*d*, forming a hollow inside space 116 between them, whose internal surfaces are in contact with concrete refractory, supporting the external plates 115*a* and 115*d* with a lattice structure of bars 117, to rigidity of the plates and supporting the internal plates 115*b* and 115*c* by a lattice structure of bars 118 and retained by crossbars 119. The vault 113 of each one of the ports are built by placing a lateral support beam 120*a* and 120*b* supported on the temporary structures CE, a curved plate 121 supported on the temporary structure CI and retained by trusses 122 inside internal concave; and a upper curved plate 123, supported on the beams 120*a* and 120*b* forming an interior hollow 124 between them. Then fill the inside cavities 116 and 124 with refractory concrete and the temporary structures are removed once the concrete refractory has hardened forming the port P, and finally empty a floor layer of refractory concrete 111, delimited by the side walls 112*a* and 112*b*.

D. Refining Section

Cup

Figure 8:
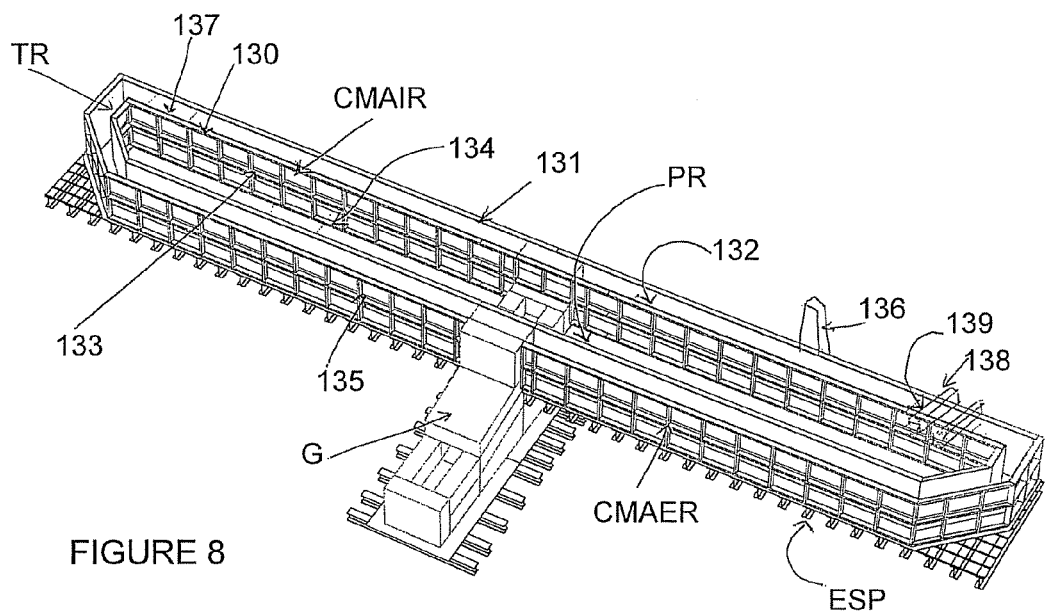
FIG. 8 is a conventional perspective view showing how to build the cup of the refining section.
Figure 9:
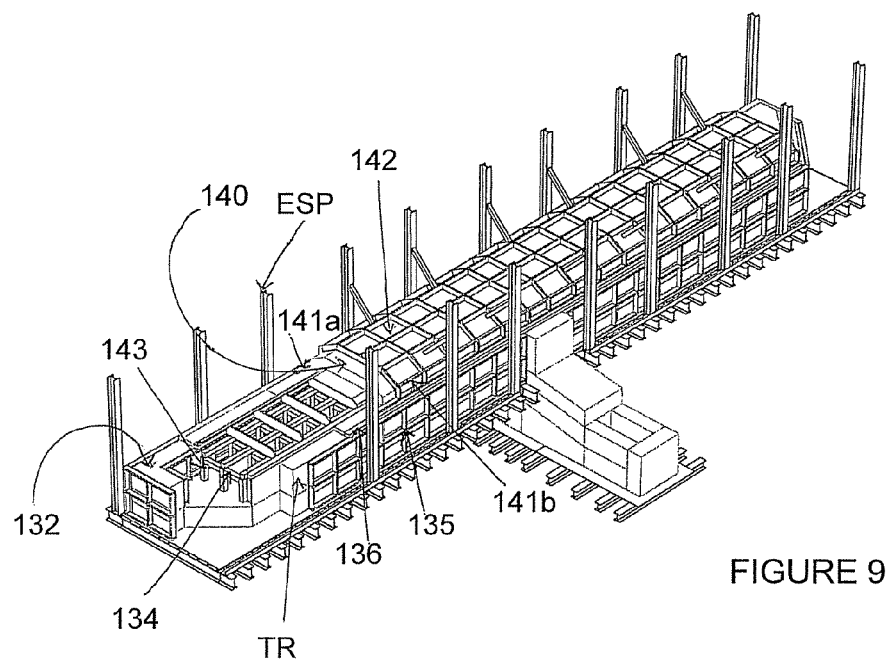
FIG. 9 is a conventional perspective view of a vault of the refining section showing how this is constructed.

The cup TR of the refining section SR, is building on the peripheral support structure of the furnace ESP (FIG. 1), building a one temporary structure of internal annular wall CMAIR (FIG. 8) built by an internal plate structure 130 and one temporary structure of outer annular wall CMAER built by an external plate structure 131, surrounding the temporary structure of internal annular wall CMAIR which are separate parallel to each other, forming a hollow annular space 132 between them; the internal plates 130 are supported externally by a lattice structure of bars 133 for rigidity, so that the internal surfaces are in contact with the refractory concrete and hold by struts 134 (FIG. 9); the outer plates 131 are supported by a lattice structure of bars 135 hold by struts 136 supported by the peripheral support structure ESP; prismatic molds 137 are placed, which are hold by bars 138 support by two temporary structures CMAIR and CMAER in the superior part to form cavities 139 required for the connection of refining section SR with the feeders A and one or more throats G of the furnace H, and finally fill the hollow annular space 132, with refractory concrete and once the concrete refractory has hardened forming a cup TR of the section refining SR, the temporary structures are removed; and finally empty a floor layer of refiner PR of refractory concrete delimited by the refiner cup TR Vault of Refining Section The vault 140 of the refiner (FIG. 9) is built placing two beams 141*a* and 141*b* of lateral support, each one supported on the peripheral support structure ESP of the furnace H and forming an temporary structure of curved box 142, resting on the beams 141*a* and 141*b* and hold for struts 143 by its interior concave part; the refractory concrete is poured by the superior part of the drawer forming the vault 140 of the refiner and once the concrete refractory has hardened the temporary structure is removed.

E. Throat

Figure 10:
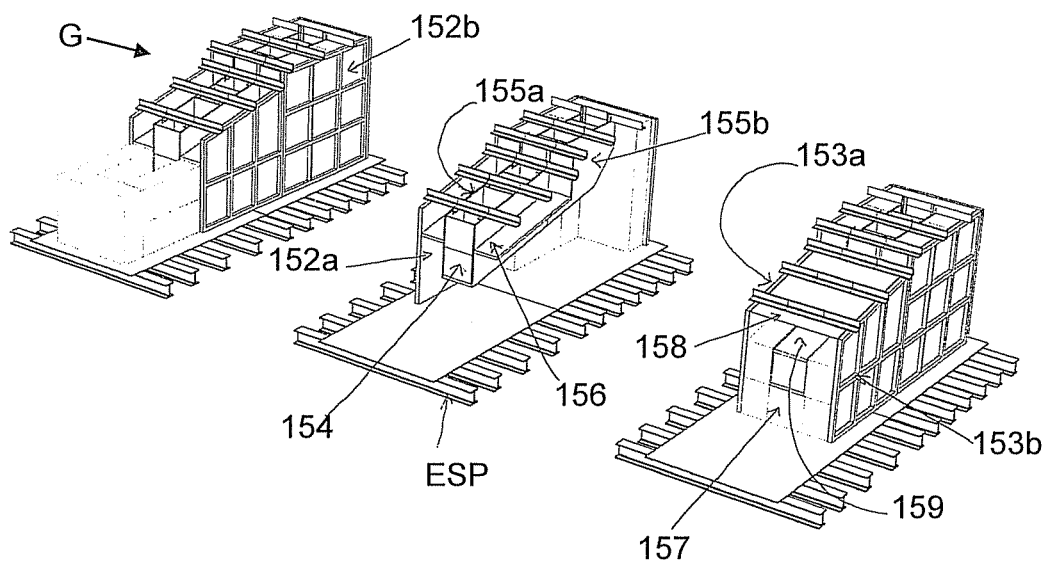
FIG. 10 is a conventional perspective view of the throat connecting the regeneration section with the refining section.

The throat G (FIG. 10) consists in a tunnel that connecting the melting section SF with the refining section SR, delimited in one of its outer for the exterior wall of the cup of the melter T and the other, in the floor PR of refining section SR; and build over peripheral support structure ESP of the furnace H, forming two outer temporary structures of trapezoidal walls 152a and 152b separated and reinforced by a lattice structure of bars 153a and 153b; and a prismatic mold 154 of trapezoidal walls 155a and 155b centrally placed between the temporary structures 152a and 152b and subject at the superior part to the same external temporary structures 152a and 152b; a superior cover 156 covering the space between the outers temporary structures 152a and 152b and prismatic mold 154 and empties the refractory concrete forming the floor 157 and walls of the throat G; once the concrete refractory has hardened the top cover 157 is removed and put another cover 158 supported on the temporary structures 152a and 152b to fill the hollow space between them and finally empties the refractory concrete forming the cover 159 of the throat G.

So specifically described the Method for the monolithic furnace construction with refractory concrete for the manufacture of glass, in accordance with the present invention, must finally be understood that is presented only as a preferred embodiment of the invention, which will be delimited only by the following claims.

We claim:

1. A method for constructing a furnace for the manufacture of glass, with refractory concrete, to obtain a monolithic unit by manufacturing, distributing and installing temporary structures and filling them with concrete refractory for the furnace construction, the furnace is of the type that comprises: furnace sections that perform specific functions of melting and refining, which are built on a structure of basal support constituted by a robust slab placed directly on a support system, as well as an assembly of columns, beams, floor systems and lateral restriction elements or bracing forming the peripheral support structure of the furnace where the robust slab wall is made with hydraulic concrete made from reinforced cement, the furnace being manufactured by: forming a first temporary structure to walls of a first section of the furnace; filling the first temporary structure with a refractory concrete, to the formation of monolithic walls corresponding to the first section of the furnace; removing the first temporary structure of the monolithic wall of the first section of the furnace once the concrete refractory has hardened; and forming subsequent temporary structures corresponding to vaults and floors once the concrete refractory has hardened from a preceding section of the furnace, forming a monolithic unit for each section of the furnace, said furnace sections including regenerative chambers with side walls, a front wall, a back wall, an intermediate wall, a vault, a floor and ports; a melter that includes a cup, side walls, a front wall, a back wall, a vault and a floor; a throat and a refiner that include a cup, a vault and a floor; and tunnels into a chimney, completely constructed of refractory concrete, characterized by: constructing each wall temporary structure with a pair of parallel side plates and a pair of outer plates, which close the side plates, forming an internal hollow space between the same, whose internal surfaces are in contact with the refractory concrete; supporting the plates by a layer of crossbars, to provide rigidity to the plates; reinforcing the crossbars layer with bars placed outside the crossbar; bracing the plates to attach the temporary structure wall; filling the inside cavity delimited by the plates with refractory concrete; removing the temporary structure once the concrete refractory has hardened; and pouring the plate refractory concrete floor delimited by walls.

2. The method for constructing a furnace for the manufacture of glass as claimed in claim 1, characterized by: forming the bottom of the founder cup and refiner by a steel plate, which is the final part of the floor; forming a composite temporary structure of panels, supported on the floor; building a wall temporary structure of cup by separate parallel plates, forming a hollow interior space between them, whose internal surfaces are in contact with the refractory concrete, forming a hollow annular space; supporting the plates with a crossbars layer to provide rigidity to the plates; supporting the walls of the laterally inside cup by diagonal crossbars whose ends rest on the walls and floor; supporting the exterior side of the cup walls with crossbars initiating from the walls until to the lateral support columns of the main peripheral structure of the furnace; filling the hollow interior space delimited by the plates with refractory concrete; removing the temporary structure once the concrete refractory has hardened; and pouring the floor plate delimited by wall with refractory concrete.

3. The method for constructing a furnace for the manufacture of glass, as claimed in claim 1, wherein the furnace comprises a superstructure of walls for the melting section, characterized by: forming a support structure attached to the peripheral support columns of the furnace; manufacturing a temporary structure of annular wall which is supported by the support structure, using parallel plates separated, forming an internal hollow space between them, whose internal surfaces will be in contact with the refractory concrete, forming a hollow annular space; supporting the plates by crossbars layer to provide rigidity to the plates; reinforcing the layer crossbars with bars placed outside the crossbars layer; holding the plates by the annular space hollow through inside crossbars; and filling the hollow annular space defined by the plates with refractory concrete.

4. The method for constructing a furnace for the manufacture of glass as claimed in claim 1, wherein the furnace comprises a superstructure of walls to the refining section, characterized by: forming a support structure attached to the peripheral support columns of the furnace; constructing a temporary structure of annular wall supported by the support structure, using parallel plates separated, forming an internal hollow space between the same, whose internal surfaces are in contact with the refractory concrete, forming a hollow annular space; supporting the plates by a crossbars layer to provide rigidity to the plates; reinforcing the layer crossbars with bars placed outside the crossbars layer; holding the plates by the annular space hollow through inside crossbars; and filling the internal hollow space defined by the plates with refractory concrete.

5. The method for constructing a furnace for the manufacture of glass, as claimed in claim 1, wherein the furnace comprises ports formed by lateral walls, floor and vault, characterized by: forming the floor of the ports by means of a steel plate attached to the peripheral support columns of the furnace; forming a composite temporary structure of panels, supported in the floor by separate parallel plates, forming an internal hollow space between the same, whose internal surfaces will be in contact with the refractory concrete; supporting the plates by a layer of crossbars, to provide rigidity to the plates; reinforcing the layer crossbars with bars placed outside to the crossbars layer; retaining the plates with inside crossbars; filling the internal hollow space delimited by the plates with refractory concrete; removing the temporary structure once the concrete refractory has hardened; and pouring a floor plate of refractory concrete which is being delimited by walls.

6. The method for constructing a furnace for the manufacture of glass, as claimed in claim 1, wherein the throat construction comprises: forming a mold of inclined floor and two trapezoidal side walls between the melter and refiner, on the support plate of the melter, using a pair of separated parallel side plates formed a hollow interior space between the same and a plate in U form, between the pair of side plates, an inclined top plate that closes the outer side plates and plate in U, forming a trapezoid, leaving an opening at the top of the trapezoid; filling the hollow space inside the trapezoid with refractory concrete to form the trapezoidal side walls and the inclined floor; removing the inclined top plate, after the refractory concrete has hardened forming the trapezoid; placing a plate in the top of the plate in U, supported by the side walls of the trapezoid, and; forming a throat cover with a pair of parallel side plates supported by side walls of the trapezoid, and a upper plate that form a box with the side plates having an opening at the half of its upper end, to fill the box with refractory concrete, forming the cover of the throat.

7. The method for constructing a furnace for the manufacture of glass, as claimed in claim 1, wherein the throat construction comprises: forming a mold of inclined floor and two trapezoidal side walls between the melter and refiner, on the support plate of the melter, using a pair of separated parallel side plates formed a hollow interior space between the same and a plate in U form, between the pair of side plates; an inclined top plate that closes the outer side plates and plate in U, forming a trapezoid, leaving an opening at the top of the trapezoid; filling the hollow interior space of the trapezoid with refractory concrete to form the trapezoidal side walls and the inclined floor; removing the superior plate after the refractory concrete has hardened forming the trapezoid; and placing a preformed plate in the top end of the plate in U, supported by the side walls of the trapezoid.

8. The method for constructing a furnace for the manufacture of glass, as claimed in claim 1, wherein the tunnels to the chimney comprises a structure for walls for the tunnels, characterized by: forming a support structure attached to the support columns; constructing a wall temporary structure resting on the support structure, by means of separated parallel plates, forming an internal hollow space between the same, whose internal surfaces will be in contact with refractory concrete; supporting the plates by a layer of crossbars to provide rigidity to the plates; reinforcing the layer crossbars with bars placed externally to the layer of crossbars; retaining plates with crossbars, within its interior; filling the internal hollow space delimited by the plates with refractory concrete; removing the temporary structure once the concrete refractory has hardened; and pouring a floor plate of refractory concrete which is being delimited by walls.

9. The method for constructing a furnace for the manufacture of glass, as claimed in claim 1, characterized by the vaults of the melting sections, regeneration, refining and tunnels to the chimney are constructed by: placing a lateral support beam supported by each one side walls of superstructure, forming a convex bottom temporary structure in a drawer form, which rests on the walls and hold by struts in a concave inside part; and pouring refractory concrete by the upper part of the drawer.

10. The method for constructing a furnace for the manufacture of glass as claimed in claim 5, characterized by, forming hollow spaces in vaults by molds embedded in the vaults for connection, records, and device installation.

* * * * *